(12) United States Patent
Asahina et al.

(10) Patent No.: US 8,298,700 B2
(45) Date of Patent: *Oct. 30, 2012

(54) PRISMATIC SEALED RECHARGEABLE BATTERY, BATTERY MODULE, AND BATTERY PACK

(75) Inventors: Takashi Asahina, Toyohashi (JP); Shinji Hamada, Toyohashi (JP); Toyohiko Eto, Kosai (JP)

(73) Assignees: Panasonic Corporation, Osaka (JP); Toyota Jidosha Kabushiki Kaisha, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/354,917

(22) Filed: Jan. 20, 2012

(65) Prior Publication Data

US 2012/0121948 A1    May 17, 2012

Related U.S. Application Data

(60) Continuation of application No. 11/703,569, filed on Feb. 7, 2007, now Pat. No. 8,124,270, which is a division of application No. 10/747,464, filed on Dec. 29, 2003, now abandoned.

(30) Foreign Application Priority Data

Dec. 27, 2002   (JP) ................................. 2002-379049

(51) Int. Cl.
   *H01M 2/16*   (2006.01)
   *H01M 2/18*   (2006.01)
(52) U.S. Cl. ........ 429/143; 429/148; 429/149; 429/157; 429/159; 429/163

(58) Field of Classification Search .................. 429/149, 429/156, 157, 148, 159, 120, 129, 178
See application file for complete search history.

(56) References Cited

U.S. PATENT DOCUMENTS

| | | |
|---|---|---|
| 3,844,841 A | 10/1974 | Baker |
| 4,150,201 A | 4/1979 | Silveyra |
| 4,324,844 A | 4/1982 | Kothmann |
| 4,882,242 A | 11/1989 | Kilb et al. |
| 5,302,473 A | 4/1994 | Bennett |
| 5,800,942 A | 9/1998 | Hamada et al. |
| 6,033,800 A | 3/2000 | Ichiyanagi et al. |
| 6,304,057 B1 | 10/2001 | Hamada et al. |
| 6,455,190 B1 | 9/2002 | Inoue et al. |
| 6,709,783 B2 | 3/2004 | Ogata et al. |
| 6,833,010 B2 | 12/2004 | Asahina et al. |
| 6,838,209 B2 | 1/2005 | Langan et al. |

(Continued)

FOREIGN PATENT DOCUMENTS

EP   0 598 194   5/1994

(Continued)

*Primary Examiner* — Jennifer Michener
*Assistant Examiner* — Heng Chan
(74) *Attorney, Agent, or Firm* — Jordan and Hamburg LLP

(57) ABSTRACT

A prismatic sealed rechargeable battery includes a substantially prismatic battery case that accommodates an electrode plate assembly and an electrolyte solution. The battery case is formed of metal. On a side face of the battery case, a thin plate is provided which has a plurality of protruding portions formed in parallel at appropriate intervals. The protruding portion and the side face form spaces opened at both ends therebetween. The thin plate is bonded to the side face of the battery case by making flat portions between the protruding portions into surface-contact with the side face, thereby improving cooling capability of the battery.

3 Claims, 4 Drawing Sheets

U.S. PATENT DOCUMENTS

| | | |
|---|---|---|
| 6,858,344 B2 | 2/2005 | Marukawa et al. |
| 6,890,683 B2 | 5/2005 | Asahina et al. |
| 2001/0007728 A1 * | 7/2001 | Ogata et al. .................. 429/120 |
| 2003/0027040 A1 | 2/2003 | Asahina et al. |

FOREIGN PATENT DOCUMENTS

| | | |
|---|---|---|
| EP | 0 834 952 | 4/1998 |
| EP | 0 962 993 | 12/1999 |
| EP | 962993 | 12/1999 |
| EP | 1 059 680 | 12/2000 |
| EP | 1 087 449 | 3/2001 |
| EP | 1087449 | 3/2001 |
| EP | 1 096 582 | 5/2001 |
| EP | 1 211 739 | 6/2002 |
| FR | 1 098 879 | 8/1955 |
| GB | 790025 | 1/1958 |
| JP | 59-108264 | 6/1984 |
| JP | 01-043841 | 11/1990 |
| JP | 8-212986 | 8/1996 |
| JP | 8-321329 | 12/1996 |
| JP | 9-120809 | 5/1997 |
| JP | 9-199094 | 7/1997 |
| JP | 10-106637 | 4/1998 |
| JP | 10-189062 | 7/1998 |
| JP | 11-126585 | 5/1999 |
| JP | 2931361 | 5/1999 |
| JP | 2001-023702 | 1/2001 |
| JP | 2001-093503 | 4/2001 |
| JP | 2001-093508 | 4/2001 |
| JP | 2001-176472 | 6/2001 |
| JP | 2001-196103 | 7/2001 |
| JP | 2002-093402 | 3/2002 |
| JP | 2002-231214 | 8/2002 |

* cited by examiner

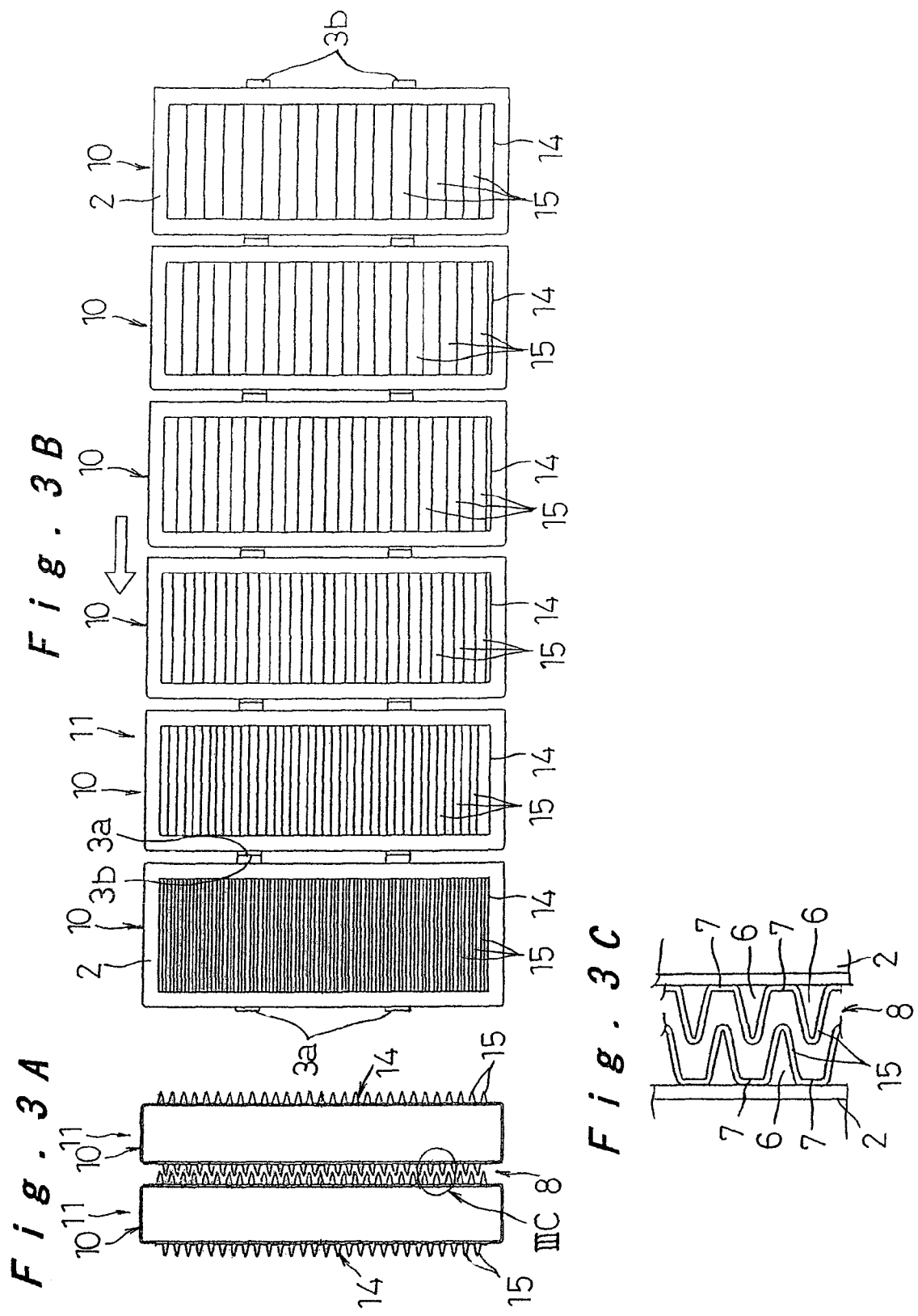

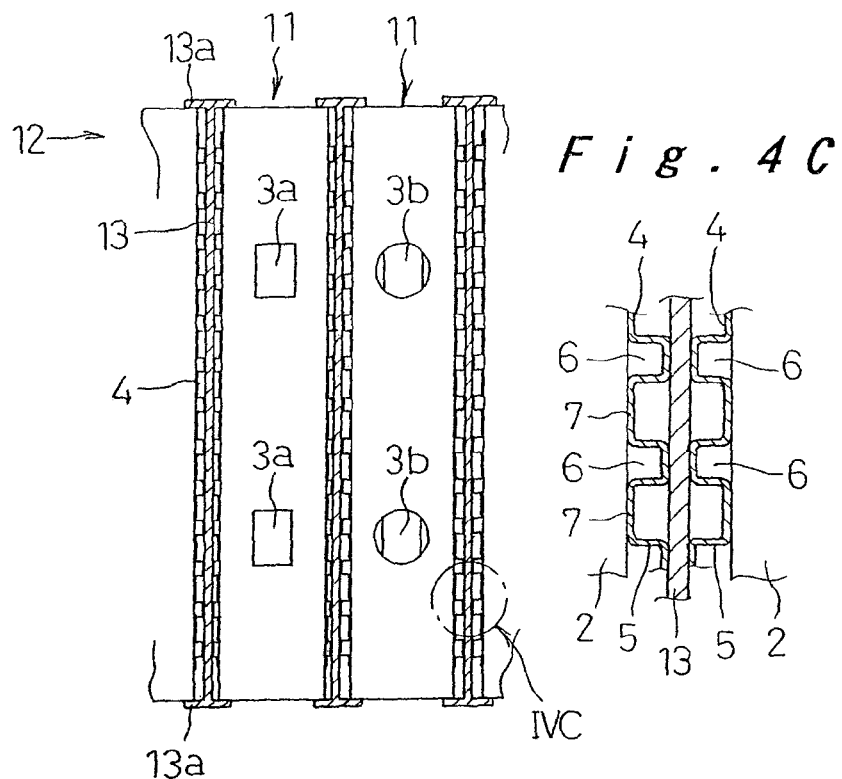
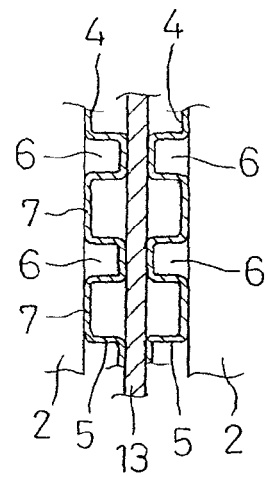
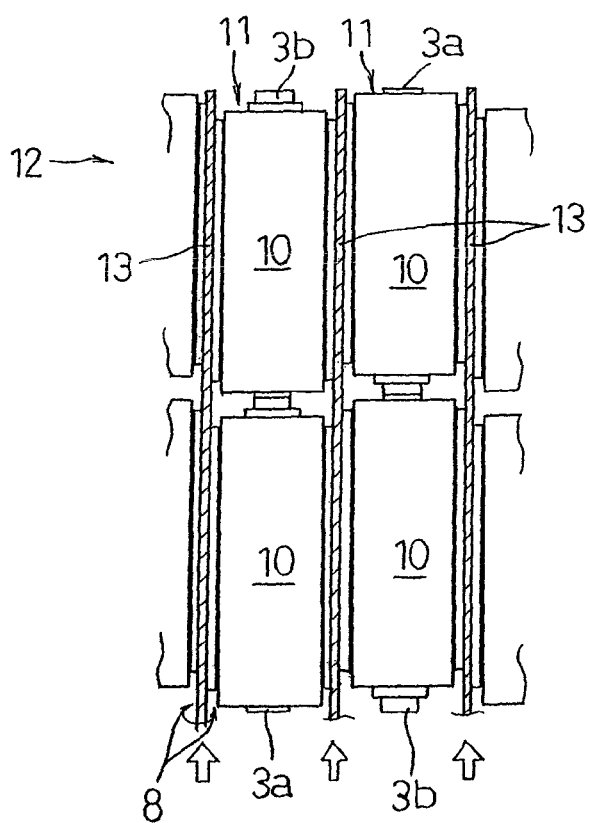

PRISMATIC SEALED RECHARGEABLE BATTERY, BATTERY MODULE, AND BATTERY PACK

CROSS REFERENCE TO RELATED APPLICATIONS

This is a continuation of U.S. patent application Ser. No. 11/703,569 filed on Feb. 7, 2007 of Takashi Asahina et al. for "Prismatic Sealed Rechargeable Battery, Battery Module, and Battery Pack;" which is a divisional of U.S. patent application Ser. No. 10/747,464 filed on Dec. 29, 2003 of Takashi Asahina et al. for "Prismatic Sealed Rechargeable Battery, Battery Module, and Battery Pack;" which claims priority to Japanese Patent Application No. 2002-379049, filed on Dec. 27, 2002, the contents from each of which are herein expressly incorporated by reference in there entirety.

BACKGROUND OF THE INVENTION

1. Field of the Invention

The present invention relates to a prismatic sealed rechargeable battery, and a battery module and a battery pack which include the rechargeable battery. More particularly, the invention relates to a prismatic sealed rechargeable battery in which an electrode plate assembly is accommodated in a substantially prismatic metal battery case, a battery module including a plurality of the prismatic sealed rechargeable batteries connected in series, and a battery pack including a plurality of the battery modules that are connected.

2. Description of the Related Art

In recent years, there have been demands for a rechargeable battery used as a power source of an electric vehicle including a fuel-cell vehicle and a hybrid vehicle to reduce its size and weight and to increase its capacity and power. As a sealed rechargeable battery that meets the above demands, a lithium ion rechargeable battery, a nickel-metal hydride battery and the like have been put into practical use.

In this type of sealed rechargeable battery, an electrode plate assembly including a strip-like positive electrode plate and a strip-like negative electrode plate that are wound spirally with a separator interposed between the positive and negative electrode plates is accommodated in a cylindrical metal case together with an electrolyte solution. From appropriate positions of the positive electrode plate and the negative electrode plate, a positive tab and a negative tab extend in opposite directions. The negative tab is welded to the bottom of the case, while the positive tab is welded to a sealing plate for sealing a case opening provided at the top of the case. The sealing plate is fixed to the case opening so as to tightly seal the case opening via a gasket.

Moreover, in a medium-scale rechargeable battery system formed by a plurality of sealed rechargeable batteries that are nickel-metal hydride batteries, that has a rated capacity in a range of several tens to several hundreds of ampere hours, it is known that a fin for enhancing heat dissipation of the sealed rechargeable battery is provided on a side face of a prismatic battery case, as disclosed in Japanese Patent No. 2931361.

In addition, Japanese Patent Laid-Open Publication No. 2001-93503 discloses a battery module in which a prismatic battery case of synthetic resin is provided by connecting a plurality of prismatic cases integrally at their shorter side faces. In each of the prismatic cases, an electrode plate assembly and an electrolyte solution are accommodated, thereby forming a cell. A plurality of cells are connected in series in the prismatic battery case.

However, the conventional battery using the cylindrical case has the following problems. First, the number of batteries that can be arranged within a predetermined space is small. Especially, in a case where a cooling path for preventing increase in the battery temperature is provided between the batteries, the space efficiency becomes further lower. Second, cooling capability for the center region of the battery is not good because the battery has a circular cross section. Consequently, high capacity efficiency per battery power cannot be achieved.

The prismatic sealed rechargeable battery disclosed in Japanese Patent No. 2931361 can solve the above-mentioned problems of the cylindrical battery and can enhance the heat dissipation effect by providing the fin therein. However, this prismatic sealed rechargeable battery is disadvantageous in cooling efficiency. In this prismatic sealed rechargeable battery, the fin is formed by a number of fins integrally formed on one face of a plate that is bonded at the other face to the side face of the battery case, thereby increasing the heat transfer surface area that faces a path of cooling fluid. However, since the outer face of the battery case is entirely covered by the plate, heat generated in the battery case is transferred through the wall of the battery case and the plate, so as to be dissipated from the surface of the plate or the fin. Thus, the heat transfer path becomes longer and it is difficult to sufficiently improve the cooling efficiency.

Furthermore, the prismatic sealed rechargeable battery disclosed in Japanese Patent Laid-Open Publication No. 2001-93503 has a problem that it is difficult to sufficiently increase the power of the battery. This is because the prismatic battery case is formed of synthetic resin, of which thermal conductivity is not large. Thus, it is difficult to sufficiently improve the cooling efficiency of the battery. In addition, both side faces of the prismatic battery case are easy to be expanded by the inner pressure generated in each cell. Thus, in a case of forming a battery pack by arranging a plurality of battery modules in parallel, it is necessary to arrange end plates at both ends of the array of the battery modules and to restrain the end plates with a rod or band. This increases the installation space of the battery pack and also increases the cost.

SUMMARY OF THE INVENTION

In light of the above-mentioned problems of the conventional techniques, an object of the present invention is to provide a prismatic sealed rechargeable battery which has high space efficiency per battery power, high cooling capability, and high power, and to provide a battery module and a battery pack which use that rechargeable battery.

A prismatic sealed rechargeable battery according to the present invention includes a substantially prismatic battery case and an electrode plate assembly and an electrolyte solution that are accommodated in the battery case, in which the battery case is formed of metal and a thin plate is provided on a side face of the battery case. The thin plate has a plurality of rib-like protruding portions, formed in parallel at appropriate intervals, for forming spaces that are opened at both ends between the side face of the battery case and the protruding portions. The thin plate is bonded to the side face of the battery case by bringing flat portions between the protruding portions into surface-contact with the side face of the battery case. Moreover, a battery module according to the invention includes a plurality of the prismatic sealed rechargeable batteries mentioned above that are connected in series. Furthermore, a battery pack according to the invention includes a plurality of the battery modules mentioned above that are arranged in parallel.

Since the prismatic sealed rechargeable battery of the invention has the substantially prismatic battery case, more batteries can be accommodated in a predetermined space as compared to a battery having a circular cross section, in a case where the batteries are arranged with cooling paths formed between the batteries. The space efficiency per battery power is increased and each battery are efficiently cooled to its center region. Moreover, since the battery case is made of metal, thermal conductivity of the battery case is large. Since the thin plate having a plurality of protruding portions is provided on the side face of the battery case so as to be bonded to the side face of the battery case by bringing the flat portions between the protruding portions into surface-contact with the side face of the battery case, a heat transfer path from the battery case to the outer face of the thin plate is made shorter while heat transfer surface area is increased by the protruding portions. Also, cooling fluid flows within the spaces formed between the protruding portions and the side face of the battery case that are opened at both ends. The cooling fluid flows smoothly because flow resistance is small even though the thin plate is provided. Thus, by making the cooling fluid flow along the protruding portions, efficient cooling and higher power are achieved. Furthermore, the protruding portions increase surface strength of the side face of the battery case, thus suppressing expansion of the side face of the battery case caused by the pressure inside the battery. In addition, since the battery case is made of metal, gas leak is prevented for a long time, thereby providing a longer operating life.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIGS. 3A, 3B, and 3C show a battery module in which prismatic sealed rechargeable batteries according to a second embodiment of the invention are arranged in parallel; FIG. 3A is a side view, FIG. 3B is a front view, and FIG. 3C is an enlarged view of a part IIIC in FIG. 3A; and FIGS. 4A, 4B, and 4C show a battery pack according to a third embodiment of the invention; FIG. 4A is a vertical cross-sectional view of a main part of the battery pack, FIG. 4B is a plan view of the main part, and FIG. 4C is an enlarged view of a part IVC in FIG. 4A.

DETAILED DESCRIPTION OF THE PREFERRED EMBODIMENTS

Embodiment 1

A prismatic sealed rechargeable battery and a battery module according to a first embodiment of the invention will be described below, with reference to FIGS. 1A, 1B, and 2.

Figure 1A:
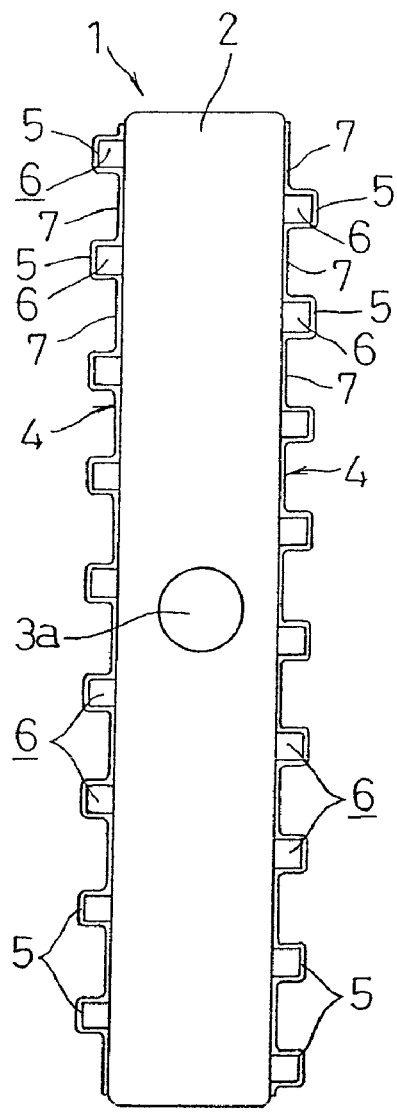
FIGS. 1A and 1B are side view and front view of a prismatic sealed rechargeable battery according to a first embodiment of the present invention.
Figure 1B:
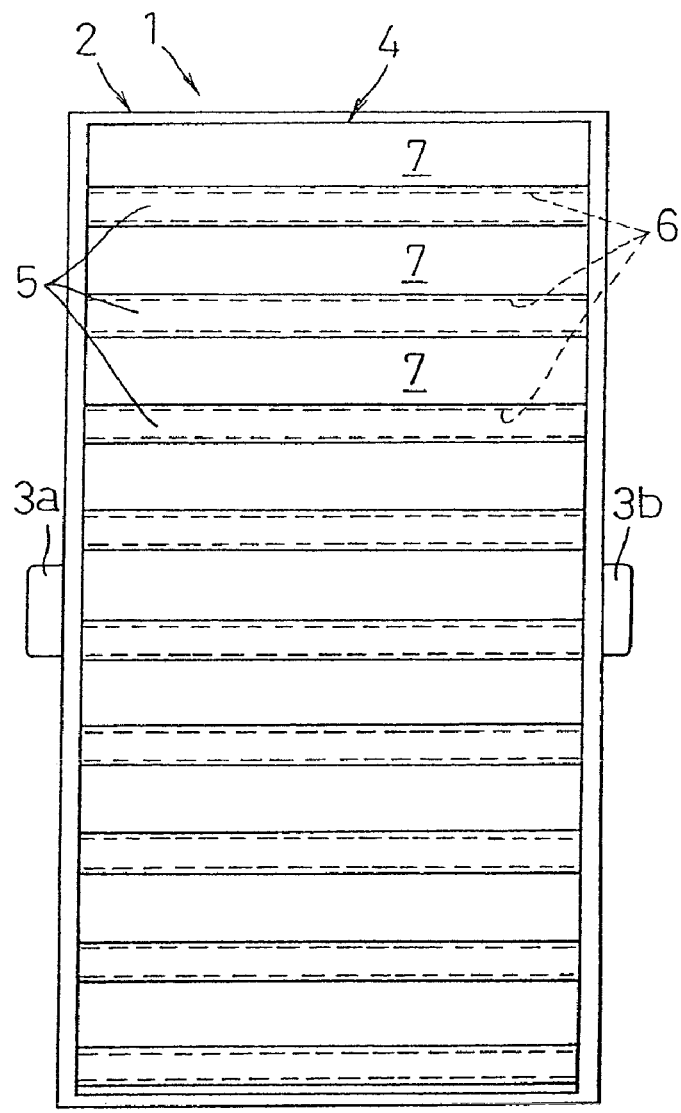
Figure 2:
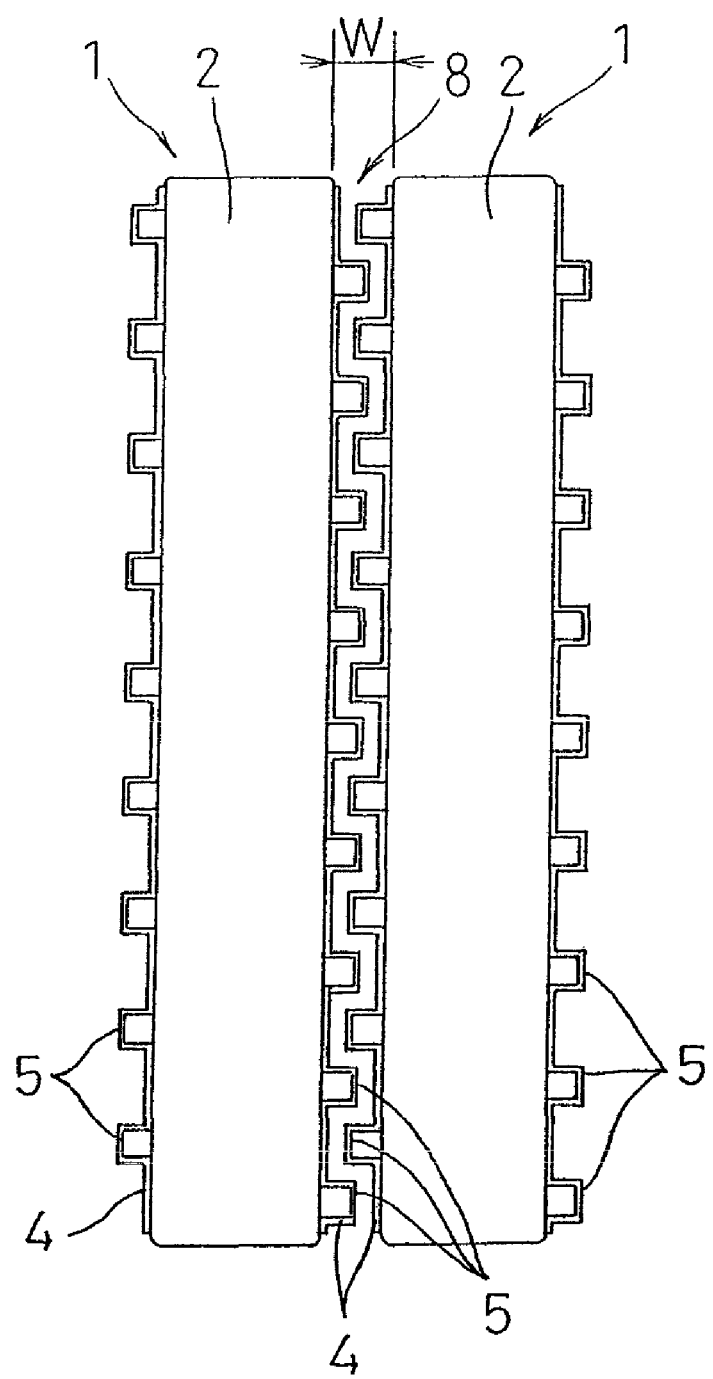
FIG. 2 is a side view of the prismatic sealed rechargeable batteries of the first embodiment, when they are arranged in parallel.

Referring to FIGS. 1A and 1B, a prismatic sealed rechargeable battery 1 includes a substantially prismatic battery case 2 formed of metal that accommodates an electrode plate assembly and an electrolyte solution. The electrode plate assembly is formed by stacking a plurality of positive electrode plates and a plurality of negative electrode plates with a separator interposed therebetween. The battery case 2 is formed by a steel plate having a thickness of about 0.3 mm to 1.0 mm that is nickel-plated in order to ensure electrolyte-resisting properties. On a pair of shorter side faces of the battery case 2 along a direction perpendicular to the longitudinal direction of the case 2, i.e., left and right side faces of the battery case 2 in FIG. 1B, a positive connection terminal 3a connected to the positive electrode plates and a negative connection terminal 3b connected to the negative electrode plates are respectively provided in such a manner that each of the terminals 3a and 3b is arranged at the center of the corresponding shorter side face to protrude.

On a pair of longer side faces of the battery case 2 along the longitudinal direction of the case 2, thin plates 4 are provided in each of which a plurality of rib-like protruding portions 5 are formed in parallel at appropriate intervals so as to form a plurality of spaces 6 each having a rectangular cross section between the longer side face and the protruding portions 5. The spaces 6 are opened at both ends. Flat portions 7, between the adjacent protruding portions 5 of the thin plate 4, are bonded to the corresponding longer side face of the battery case 2 while being in surface-contact with that longer side face. The flat portions 7 are bonded to the battery case 2 by brazing using nickel brazing filler metal or the like, a laser beam welding or an electron beam welding, for example.

The thin plate 4 is preferably formed of a nickel-plated steel sheet as with the battery case 2, in view of bonding capability with respect to the battery case 2. In view of cooling efficiency, it is preferable that the thin plate 4 is formed of an aluminum sheet having excellent thermal conductivity. In this case, it is necessary to bond the thin plate 4 to the battery case 2 with appropriate brazing filler metal or adhesive. Moreover, a clad plate of aluminum and nickel or nickel-plated steel sheet can be used as the thin plate 4.

The protruding portions 5 of the thin plate 4 are arranged in such a manner that the protruding portions 5 on one longer side face of the battery case 2 are staggered with respect to the protruding portions 5 on the opposed longer side face, as shown in FIG. 1A. Due to this, in a case where a plurality of prismatic sealed rechargeable batteries 1 are arranged in parallel with a cooling path 8 provided between the adjacent longer side faces of the cases 2 of the adjacent batteries 1, the protruding portions 5 on one of the adjacent batteries 1 do not interfere with the protruding portions 5 on the other battery 1. Thus, the width W of the cooling path 8 can be set to a relatively small dimension while the height of the protruding portions 5 is made relatively higher in order to enhance cooling effect, thereby reducing the space occupied by the batteries 1 and improving the space efficiency per power.

Moreover, the longer side face of the battery case 2 on which the thin plate 4 is provided is constituted to have surface strength sufficient for preventing deformation beyond a predetermined degree of deformation while a predetermined inner pressure acts on the battery case 2. Thus, it is preferable that the thin plate 4 has a thickness of about 0.1 mm to 0.5 mm. More specifically, the thin plate 4 can be made relatively thin in a case where the longer side face of the battery case 2 has larger surface strength, whereas it can be made relatively thick in a case where the longer side face has smaller surface strength.

In this embodiment, the thin plate 4 is arranged to set both ends of the protruding portions 5 toward the shorter side faces of the battery case 2, on which the connection terminals 3a and 3b are respectively provided. In this arrangement, cooling fluid flows along the longitudinal direction of the protruding portions 5, i.e., horizontally in FIG. 1B. Alternatively, the thin plate 4 can be arranged to set both ends of the protruding portions 5 toward a top face and a bottom face that are perpendicular to the shorter side faces respectively having the connection terminals 3a and 3b formed thereon. In this case, the cooling fluid flows up and down, although the structure in this case is not shown.

According to the present embodiment, in a case where a plurality of the rechargeable batteries 1 are arranged in a predetermined space, especially in a case where the rechargeable batteries 1 are arranged with the cooling path 8 formed between the adjacent ones of the rechargeable batteries 1, those rechargeable batteries 1 can be arranged with high space efficiency because the battery case 2 is substantially prismatic. The occupied space per battery power is thereby reduced and cooling capability is improved with respect to the entire cross section of the battery.

Since the battery case 2 is formed of metal, thermal conductivity is high. Moreover, the thin place 4 having a plurality of protruding portions 5 is provided on each of opposite two longer side faces of the battery case 2 and the thin plate 4 is bonded to the corresponding longer side face at the flat portions 7 between the protruding portions 5 by bringing the flat portions 7 into surface-contact with that longer side face. Thereby, the electrode plate assembly in the battery case 2 is efficiently cooled from both sides and a heat transfer path from the electrode plate assembly to the outer surface of the thin plate 4 is short, Furthermore, the protruding portions 5 increases a heat transfer surface area, and the cooling fluid is allowed to flow within the spaces 6 that are formed between the protruding portions 5 and the corresponding longer side face of the battery case 2 to be opened at both ends. In addition, the flow resistance provided by the thin plate 4 is small and the cooling fluid flows smoothly. Thus, the prismatic sealed rechargeable battery 1 is efficiently cooled by making the cooling fluid flow along the protruding portions 5, thereby achieving high power.

Moreover, the thin plate 4 having the protruding portions 5 formed therein is bonded to the longer side face of the battery case 2, and the thin plate 4 and the corresponding longer side face provides surface strength sufficient for preventing deformation beyond a predetermined degree of deformation while a predetermined inner pressure acts on the battery case 2. Thus, expansion of the longer side faces of the battery case 2 caused by the inner pressure in the battery 1 is prevented. Consequently, in a case where a plurality of the prismatic sealed rechargeable batteries 1 are arranged in parallel to form a battery pack in such a manner that the longer side faces of the battery cases 2 of the adjacent batteries 1 are opposed to each other, as shown in FIG. 2, it is not necessary to provide end plates at both ends of the array of the rechargeable batteries 1 in order to restrain the batteries 1. Thus, installation space as well as the cost of the battery pack is reduced.

In addition, since the protruding portions 5 of the thin plates 4 provided on two opposed longer side faces of the battery case 2 are arranged in such a manner that the protruding portions 5 on one longer side face are staggered with respect to the protruding portions 5 on the other longer side face. This reduces the dimension between the adjacent batteries 1 when a plurality of the prismatic sealed rechargeable batteries 1 are arranged in parallel, thereby increasing the power per occupied space. In a case where those prismatic sealed rechargeable batteries 1 are connected in series by setting those batteries 1 toward opposite directions alternately and connecting adjacent terminals of those batteries 1, this is achieved by arranging the batteries 1 that are not inverted and the inverted batteries 1 alternately.

Since the case 2 is formed of metal, gas leak is completely prevented for a long time, thereby achieving a longer operating life.

The battery case 2 has a rectangular cross section in the above description, however the cross-sectional shape of the battery case 2 can be a rectangle having rounded corners or an ellipse. Moreover, in the above example, each of the positive connection terminal 3a and the negative connection terminal 3b is provided on the corresponding shorter side face of the battery case 2 at one location, i.e., the center in the longitudinal direction of the shorter side face. However, the positive and negative connection terminals can be provided at a plurality of locations that are symmetric in the longitudinal direction.

Embodiment 2

A battery module using a prismatic sealed rechargeable battery according to a second embodiment of the invention will be described with reference to FIGS. 3A-3C.

In the present embodiment, a prismatic sealed rechargeable battery 10 constituting a battery module 11 has basically the same structure as that described in the first embodiment. Thus, the same components as those described in the first embodiment are labeled with the same reference numerals, and differences between the first and second embodiments will be mainly described.

As shown in FIG. 3B, the battery module 11 includes a plurality of (six in the shown example) prismatic sealed rechargeable batteries 10 that are arranged in a direction parallel to the longer side faces in such a manner that the shorter side face of the battery 10 on which the positive or negative connection terminal 3a or 3b is provided is opposed to the shorter side face of the adjacent battery 10 on which the negative or positive connection terminal 3b or 3a is provided. The adjacent prismatic sealed rechargeable batteries 10 are mechanically bonded with each other by irradiating sides of tops of the positive and negative connection terminals 3a and 3b that are opposed with a laser beam, an electron beam or the like from a space between the battery cases 2 while those connection terminals 3a and 3b are brought into contact. Thereby, the prismatic sealed rechargeable batteries 10 are electrically connected in series. Moreover, in this embodiment, in order to increase the bonding strength and achieve uniform distribution of a current flowing through the electrode plates in the respective prismatic sealed rechargeable battery 10, a plurality of positive connection terminals 3a and a plurality of negative connection terminals 3b (a pair of positive connection terminals 3a and a pair of negative connection terminals 3b in the shown example) are respectively arranged on the corresponding shorter side faces symmetrically with respect to the center in the longitudinal direction.

In a thin plate 14 bonded to each prismatic sealed rechargeable battery 10, protruding portions 15 each having a substantially triangular cross section are formed in such a manner that each protruding portion 15 extends horizontally in FIG. 3B to set both ends of the protruding portion 15 toward the shorter side faces on which the connection terminals 3a and 3b are provided.

A plurality of battery modules 11 each having the above structure are arranged in parallel with a cooling path 8 interposed between the adjacent battery modules 11, thereby forming a battery pack. In that cooling path 8, cooling fluid is made to flow in the direction in which the rechargeable batteries 10 are arranged, as shown with the arrow in FIG. 3B. Moreover, the number of the protruding portions 15 in the thin plate 4 of the prismatic sealed rechargeable battery 10 arranged in the downstream of the flow of the cooling fluid is more than that in the upstream.

According to the above structure, by making the cooling fluid in the cooling path 8 between the adjacent battery modules 11 flow in the direction in which the rechargeable batteries 10 of the respective battery module 11 are arranged, the respective prismatic sealed rechargeable battery 10 is efficiently cooled from both sides. Even if the temperature of the cooling fluid increases in the downstream of the flow, the efficiency of the cooling by the thin plate 14 is higher in the downstream than that in the upstream. Thus, the respective prismatic sealed rechargeable battery 10 are cooled evenly.

It is preferable to set variation in the temperature of the respective prismatic sealed rechargeable battery 10 within a range from 3° C. to 5° C. by adjusting the number of the protruding portions 15 while the structure is made compact by making the cooling fluid flow in the horizontal direction as shown in FIG. 3B.

Please note that the thin plate 14 can be arranged so as to set both ends of the protruding portions 15 upward and downward, i.e., the directions perpendicular to the direction in which the prismatic sealed rechargeable batteries 10 are arranged. In this case, by making the cooling fluid flow up and down, the respective prismatic sealed rechargeable battery 10 are evenly cooled even if the number of the protruding portions 15 is set to be equal in all the batteries 10.

Embodiment 3

Next, a battery pack according to a third embodiment of the invention will be described with reference to FIGS. 4A-4C.

As shown in FIGS. 4A and 4B, a battery pack 12 includes a plurality of battery modules 11 arranged in parallel. The battery modules 11 are electrically connected in series one by one and a plate-like insulator 13 is interposed between the thin plates 4 of the adjacent battery modules 11.

In the shown example, the protruding portions 5 of the thin plate 4 are formed to have a rectangular cross section in such a manner that the protruding portions 5 on the battery module 11 are opposed to those on the adjacent battery module 11. The insulator 13 is interposed between the opposed protruding portions 5. The insulator 13 has engagement flanges 13a having T-shaped cross section at upper and lower ends thereof. By engagement of the engagement flanges 13a with the upper end face and lower end face of the battery module 11, the insulator 13 is held.

By interposing the insulator 13 between the adjacent battery modules 11 as described above, breakdown between the batteries 10 or battery modules 11 caused by vibration or shock is prevented when the battery pack 12 is mounted on a vehicle, while ensuring sufficient cooling capability of the prismatic sealed rechargeable battery 10 in the battery pack 12.

In the present embodiment, the cross-sectional shape of the protruding portion 5 of the thin plate 4 can be triangular or wave-like shape, instead of the rectangular shape. Also, the protruding portions 5 on both of the adjacent side faces of the adjacent battery modules 11 can be staggered. However, the arrangement shown in FIGS. 4A-4C improves the resistance to the vibration or shock when the battery pack 12 is mounted on a vehicle.

According to the prismatic sealed rechargeable battery and the battery module of the present invention, since the case is substantially prismatic, the number of batteries that can be accommodated in a predetermined space is increased so as to improve the space efficiency per battery power. In addition, thermal conductivity of the case is high because the battery case is formed of metal. Moreover, the thin plate having a plurality of protruding portions is provided on the side face of the battery case and is bonded to that side face by bringing the flat portions between the protruding portions of the thin plate into surface-contact with that side face. Thereby, the heat transfer path from the battery case to the outer face of the thin plate is shorter and the heat transfer surface area is increased due to the protruding portions. In addition, the cooling fluid flows in the spaces formed between the protruding portions and the side face of the battery case. Thus, by making the cooling fluid flow along the protruding portions, the battery is efficiently cooled so as to achieve high power. Moreover, the aforementioned thin plate improves the surface strength of the side face of the battery case. Furthermore, the battery case prevents gas leak for a long time because the battery case is made of metal, thereby achieving longer operating life.

According to the battery pack of the invention, including a plurality of the battery modules arranged in parallel in each of which a plurality of the prismatic sealed rechargeable batteries are connected in series, the cooling capability of the respective rechargeable battery is ensured and breakdown between the batteries or battery modules caused by vibration or shock is prevented when the battery pack is mounted on a vehicle.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

The invention claimed is:

1. A battery pack comprising:
   a plurality of prismatic sealed rechargeable batteries arranged in parallel to form the battery pack, in which longer side faces of battery cases of adjacent ones of the plurality of prismatic sealed rechargeable batteries are opposed to each other, said plurality of prismatic sealed rechargeable batteries comprising a first prismatic battery and a second prismatic battery, each one of the first prismatic battery and second prismatic battery comprising:
   a substantially prismatic battery case formed of metal, said battery case having first and second longer side faces opposing one another and third and fourth shorter side faces opposing one another and being perpendicular to the first and second side faces; and
   an electrode plate assembly and an electrolyte solution accommodated in said battery case;
   wherein the first prismatic battery further comprises a first thin plate provided on the first side face, and having a plurality of ribbed protruding portions and a plurality of flat portions, the ribbed protruding portions and flat portions alternating with one another so that a ribbed protruding portion occurs between each two nearest flat portions and a flat portion occurs between each two nearest ribbed protruding portions, said first thin plate being connected to said first side face so that flat portions of the first thin plate come into surface-contact with the first side face and so that each one ribbed protruding portion of the first thin plate defines a first side face channel along a length of said one ribbed protruding portion and is open at each end of said one ribbed protruding portion, said first side face channel having walls defined by said one ribbed protruding portion and said battery case;
   wherein the second prismatic battery further comprises a second thin plate provided on the second side face, and having a plurality of ribbed protruding portions and a plurality of flat portions, the ribbed protruding portions and flat portions alternating with one another so that a ribbed protruding portion occurs between each two nearest flat portions and a flat portion occurs between each two nearest ribbed protruding portions, said second thin plate being connected to said second side face so that flat portions of the second thin plate come into surface-contact with the second side face and so that each one ribbed protruding portion of the second thin plate defines a second side face channel along a length of said one ribbed protruding portion and is open at each end of said one ribbed protruding portion, said second side face channel having walls defined by said one ribbed protruding portion and said battery case;

wherein said first prismatic battery is arranged in parallel with the second prismatic battery in a manner in which the first thin plate of the first prismatic battery faces the second thin plate of the second prismatic battery with a first cooling fluid path occurring between said first prismatic battery first thin plate and said second prismatic battery second thin plate; and wherein cooling fluid is allowed to flow along said first cooling fluid path, within each first side face channel of the first prismatic battery first thin plate, and within each second side face channel of the second prismatic battery second thin plate.

2. The battery pack of claim 1, wherein the ribbed protruding portions of the first prismatic battery first thin plate are offset from the ribbed protruding portions of the second prismatic battery second thin plate so as to align with the flat portions of the second prismatic battery second thin plate.

3. The battery pack of claim 1, wherein the first prismatic battery is one of a plurality of first prismatic batteries arranged in a row, and wherein a number of said ribbed protruding portions on respective first prismatic batteries varies along said row.

* * * * *